US011983996B2

(12) United States Patent
Lukasik

(10) Patent No.: US 11,983,996 B2
(45) **Date of Patent: *May 14, 2024**

(54) SYSTEMS AND METHODS FOR GAMING USING HISTORICAL DATA

(71) Applicant: DK CROWN HOLDINGS INC., Boston, MA (US)

(72) Inventor: John Lukasik, Las Vegas, NV (US)

(73) Assignee: DK Crown Holdings Inc., Boston, MA (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/848,041

(22) Filed: Jun. 23, 2022

(65) Prior Publication Data

US 2022/0319281 A1 Oct. 6, 2022

Related U.S. Application Data

(63) Continuation of application No. 16/899,238, filed on Jun. 11, 2020, now Pat. No. 11,398,139, which is a continuation of application No. 15/862,440, filed on Jan. 4, 2018, now Pat. No. 10,720,023.

(60) Provisional application No. 62/442,115, filed on Jan. 4, 2017.

(51) Int. Cl.
*G07F 17/32* (2006.01)

(52) U.S. Cl.
CPC ...... *G07F 17/3288* (2013.01); *G07F 17/3209* (2013.01); *G07F 17/3211* (2013.01); *G07F 17/3225* (2013.01); *G07F 17/3262* (2013.01)

(58) Field of Classification Search
CPC ...... A63F 13/65; A63F 13/68; A63F 2300/69; G07F 17/3244; G07F 17/3262
See application file for complete search history.

(56) References Cited

U.S. PATENT DOCUMENTS

2004/0029627 A1 2/2004 Hannan et al.
2007/0087804 A1 4/2007 Knowles et al.
2009/0156311 A1 6/2009 Ng et al.
2011/0246889 A1 10/2011 Moore
2014/0200070 A1 7/2014 Bahou
2014/0315614 A1 10/2014 Granich et al.
2018/0015360 A1 1/2018 Litman
2018/0190076 A1 7/2018 Lukasik
2019/0221072 A1 7/2019 Litman

OTHER PUBLICATIONS

International Preliminary Report on Patentability on PCT Appl. No. dated Mar. 23, 2023.
International Search Report and Written Opinion on PCT Appl. No. PCT/US2021/049828 dated Jan. 28, 2022.
Notice of Allowance on U.S. Appl. No. 17/018,640 dated Nov. 25, 2022.

(Continued)

*Primary Examiner* — Lawrence S Galka
(74) *Attorney, Agent, or Firm* — Foley & Lardner LLP

(57) ABSTRACT

Methods and systems are described herein for gaming using historical performance data. A listing of entities is provided to a user. A selection of entities is received from the user. Historical performance data for each of the selected entities during a given performance period is compared to a performance benchmark. A payout is provided based on the number of selected entities that met the performance benchmark during their respective performance period.

20 Claims, 8 Drawing Sheets

200a 302 304

| # of Players Score | Payout |
|---|---|
| 5 or less | 0 |
| 6 | 5 |
| 7 | 10 |
| 8 | 25 |
| 9 | 30 |
| 10 | 100 |

(56) References Cited

OTHER PUBLICATIONS

Non-Final Office Action on U.S. Appl. No. 17/018,640 dated Jun. 2, 2022.
Non-Final Office Action on U.S. Appl. No. 18/194,956 dated Dec. 21, 2023.

302 304

| # of Players Score | Payout |
|---|---|
| 5 or less | 0 |
| 6 | 5 |
| 7 | 10 |
| 8 | 25 |
| 9 | 30 |
| 10 | 100 |

FIG. 3

SYSTEMS AND METHODS FOR GAMING USING HISTORICAL DATA

CROSS-REFERENCE TO RELATED PATENT APPLICATIONS

This application is a continuation of U.S. Non-Provisional patent application Ser. No. 16/899,238, filed on Jun. 11, 2020, which is a continuation of U.S. Non-Provisional patent application Ser. No. 15/862,440, filed on Jan. 4, 2018, and granted as U.S. Pat. No. 10,720,023 on Jul. 21, 2020, which claims priority to U.S. Provisional Patent Application No. 62/442,115, filed on Jan. 4, 2017, all of which are incorporated by reference herein in their entireties.

SUMMARY

It is to be understood that both the following general description and the following detailed description are exemplary and explanatory only and are not restrictive. Provided are methods and systems for gaming using historical performance data. Credits (e.g., coins, tickets, money, tokens, credit card information, debit card information, etc.) can be received from a user to initiate a round of a game. A listing of entities can be provided to a user. A selection of one or more of the entities can be received from a user. A performance period can then be selected for each of the entities. For each of the selected entities, it is determined whether the respective selected entity met a performance benchmark in their corresponding selected performance period according to historical performance data. A payout for the round of the game is based on a number of the selected entities that satisfied the performance benchmark during their respective performance period.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 is a chart depicting example payouts for the gaming methods described herein;

DETAILED DESCRIPTION

Figure 1A:
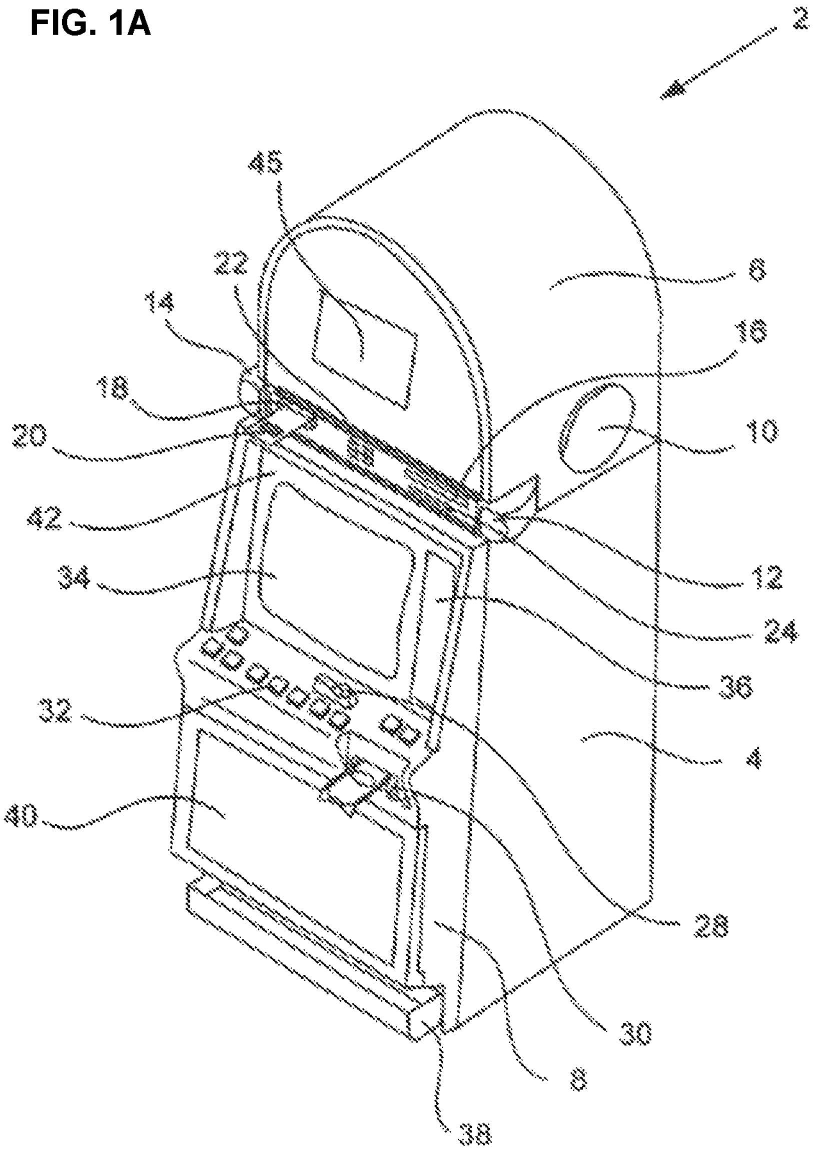
FIG. 1A shows an exemplary electronic gaming table on which the gaming methods can be executed.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems are described herein for a game using historical performance data. Credits (e.g., coins, tickets, money, tokens, credit card information, debit card information, etc.) can be received from a user to initiate a round of a game. A listing of entities can be provided to a user. The entities can include, for example, sports players, stocks, or other entities as can be appreciated. In an aspect, the listing of entities may be provided as a subset of entities selected from a pool of entities. In such an aspect, the subset of entities may be selected randomly from the pool of entities. In an aspect, the entities may be organized into groups. For example, the groups may include performance tiers, sports team positions, or other groups. In such an aspect, the listing of entities may be provided according to the respective groups. In an aspect, each of the entities may correspond to a temporal constraint such as a year, a season, or other time period that will serve as a constraint for selecting a performance period, as will be described below. For example, a sports team player may correspond to a particular season or year. As another example, a stock may be associated with a particular year, fiscal year, or other period.

A selection of one or more of the entities can be received from a user. In aspects in which the entities are organized into groups, this can include a selection of a predefined number of entities from each of the groups. A performance period can then be selected for each of the selected entities. The performance period can include a particular game, season, date range, or other period for each of the selected entities. In aspects in which the selected entities correspond to a particular temporal constraint, the performance period can be selected from within the temporal constraint. For example, for a sports player corresponding to a particular season as a temporal constraint, the performance period may correspond to a game or series from within the particular season. As another example, for a stock corresponding to a particular year as a temporal constraint, the performance period may correspond to a particular day, week, month, or quarter within the particular year. The performance period can be selected randomly, by applying one or more rules, or according to other criteria.

For each of the selected entities, it is determined whether the respective selected entity met a performance benchmark in their corresponding selected performance period according to historical performance data. For example, assume that the performance period is a randomly selected game for each selected player. Historical performance data for that particular player and game is accessed to determine if the player met a performance benchmark. The performance benchmark could include a number of runs or points scored, a number of yards gained, a number of successful or attempted shots, or other performance benchmark as can be appreciated. In an aspect, the performance benchmark may be the same or different for each of the selected entities. For example, the performance benchmark for a kicker in football may be a number of successful field goals or a maximum distance of a kickoff or punt, while the performance benchmark for a quarterback may be a total number of passing yards.

In an aspect, the historical performance data may be updated prior to determining whether the respective selected entity met a performance benchmark in their corresponding selected performance period. For example, the historical performance data for a quarterback in football may have changed in the intervening time period between the start of the game and the selection of the one or more of the entities by the user. Updating the historical performance data would allow the game to be more accurate when determining whether the performance benchmark was met.

A payout for the round of the game is based on a number of the selected entities that satisfied the performance benchmark during their respective performance period. In an aspect, the payout may be based on a bet or number of credits used to initialize the round of the game. In an aspect, the payout from one round of the game may serve as a credit or bet for a subsequent round of the game. The disclosed gaming model includes both chance-based and skill-based components for winning. Chance-based components can include which entities are presented to a user for selection, which performance period is selected for a given selected entity, and what performance benchmark is used for comparison to the historical data for a given entity and performance period. Skill-based components can include which entities are selected from the listing of entities based on a user's historical knowledge and estimations of historical entity performance.

Turning to FIG. 1A, a video gaming machine 2 in accordance with the methods and systems described herein is shown. Machine 2 can comprise a main cabinet 4, which can surround the machine interior (not shown) and can be viewable by users. The main cabinet can comprise a main door 8 on the front of the machine, which opens to provide access to the interior of the machine. Player-input switches or buttons 32, a coin acceptor 28, and a bill validator 30, a coin tray 38, and a display area including a mechanical gaming system (or a separate electronic game) 40 can be attached to the main door 8. There can be an overlay of touchscreen functionality on the separate electronic game 40 or some of the buttons 32 can be functional on the separate mechanical gaming system 40. The separate mechanical gaming system can be in a relatively vertical viewing position as shown or in a more horizontal (table like) display unit. A video display monitor 34 and an information panel 36 can be viewable through the main door 8. The display monitor 34 can be a cathode ray tube, high resolution flat-panel LCD, LED, plasma screen or other conventional electronically controlled video monitor. The example, the video display monitor 34 can be used to display the user interfaces shown in FIGS. 2A and 2B. The information panel 36 can be a back-lit, silk screened glass panel with lettering to indicate general game information comprising, for example, a game denomination (e.g. $0.25 or $1). The bill validator 30, player-input switches 32, video display monitor 34, and information panel 36 can be devices used to play a game on the game machine 2. The devices can be controlled by circuitry (e.g., the master gaming controller) housed inside the main cabinet 4 of the machine 2.

The gaming machine 2 can be operable to provide a play of a game of chance and/or a game of skill. The instances may be differentiated according to themes, sounds, graphics, type of game (e.g., slot game vs. card game), denomination, number of paylines, maximum jackpot, progressive or non-progressive, bonus games, etc. The gaming machine 2 can be operable to allow a player to select a game of chance and/or a game of skill to play from a plurality of instances available on the gaming machine 2. For example, the gaming machine 2 can provide a menu with a list of the instances of games that are available for play on the gaming machine 2 and a player can be able to select from the list a first instance of a game of chance and/or a game of skill that they wish to play.

The various instances of games available for play on the gaming machine 2 can be stored as game software on a mass storage device in the gaming machine 2 or can be generated on a remote gaming device and displayed on the gaming machine 2. In an aspect, the game software can be configured for performing the methods disclosed herein. The gaming machine 2 can executed game instructions, such as but not limited to video streaming instructions that allow the game to be displayed on the gaming machine 2. When an instance is stored on the gaming machine 2, the instance can be loaded from the mass storage device into a RAM for execution. In some cases, after a selection of an instance, the game instructions that allow the selected instance to be generated can be downloaded from a remote gaming device, such as another gaming machine.

The gaming machine 2 can comprise a top box 6, which can sit on top of the main cabinet 4. The top box 6 can house a number of devices, which can be used to add features to a game being played on the gaming machine 2, can comprise speakers 10, 12, 14, a ticket printer 18, a key pad 22, a florescent display 16, a card reader 24, and a video display screen 42. The ticket printer 18 can be used to print tickets for a cashless ticketing system, such as print bar-coded ticket 20. For example, the ticket printer 18 can be used to print a ticket in use with the game using the user interface shown in FIG. 1D. The key pad can be used for entering player tracking information. The florescent display 16 can be used for displaying player tracking information. For example, the florescent display 16 can be used to display player tracking information for a player playing the game using the user interface shown in FIG. 1D. The card reader 24 can be used for entering a magnetic striped card comprising player tracking information. For example, the card reader 24 can be used to add credits for playing the game using the user interfaces shown in FIGS. 2A and 2B. Further, the top box 6 can house different or additional devices than shown in FIG. 1A. For example, the top box 6 can comprise a bonus wheel or a back-lit silk screened panel which can be used to add bonus features to the game being played on the gaming machine. As another example, the top box 6 can comprise a display for a progressive jackpot offered on the gaming machine. During a game, these devices can be controlled and powered, at least in part, by circuitry (e.g. a master gaming controller) housed within the main cabinet 4 of the gaming machine 2.

It is to be understood that gaming machine 2 is but one example from a wide range of gaming machine designs on which the methods and systems described herein can be implemented. For example, not all suitable gaming machines have top boxes or player tracking features. Further, some gaming machines have only a single game display-mechanical or video, while others are designed for bar tables and have displays that face upwards. As another example, a game can be generated on a host computer and can be displayed on a remote terminal or a remote gaming device. The remote gaming device can be connected to the host computer via a network of some type such as a local area network, a wide area network, an intranet or the Internet. The remote gaming device can be a portable gaming device such as but not limited to a cell phone, a personal digital assistant, or a wireless game player. Images rendered from 3-D gaming environments can be displayed on portable gaming devices that are used to play a game of chance and/or a game of skill. Further a gaming machine or server can comprise gaming logic for commanding a remote gaming device to render an image from a virtual camera in a 3-D gaming environment stored on the remote gaming device and to display the rendered image on a display located on the remote gaming device. Thus, those of skill in the art will understand that the systems and methods described herein can be deployed on most any gaming machine now available or hereafter developed.

In an aspect, the gaming machine 2 can be implemented with special features and/or additional circuitry that differentiates them from general-purpose computers (e.g., desktop personal computers (PCs) and laptops). Gaming machines can be highly regulated to ensure fairness and, in many cases, gaming machines are operable to dispense monetary awards of multiple millions of dollars. Therefore, to satisfy security and regulatory requirements in a gaming environment, hardware and software architectures can be implemented in gaming machines that differ significantly from those of general-purpose computers. For example, the gaming machine 2 can employ one or more hardware/software components and architectures such as watchdog timers, voltage monitoring systems, state-based software architecture and supporting hardware, specialized communication interfaces, security monitoring and trusted memory.

A watchdog timer can be used in gaming machine 2 to provide a software failure detection mechanism. In a normally operating system, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time.

The gaming machine 2 can comprise a power supply with voltage monitoring circuitry comprising two thresholds of control. The first threshold can generate a software event that can be detected by the operating software and an error condition generated. This threshold is triggered when a power supply voltage falls out of the tolerance range of the power supply, but is still within the operating range of the circuitry. The second threshold can be set when a power supply voltage falls out of the operating tolerance of the circuitry. In this case, the circuitry generates a reset, halting operation of the computer.

The standard method of operation for game software is to use a state machine. Different functions of the game (bet, play, result, points in the graphical presentation, etc.) can be defined as a state. When a game moves from one state to another, critical data regarding the game software is stored in a custom non-volatile memory subsystem. This can ensure the player's wager and credits are preserved and to minimize potential disputes in the event of a malfunction on the gaming machine 2.

In general, the gaming machine 2 does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine 2 is restored during the play of a game of chance and/or a game of skill, game play may resume and the game may be completed in a manner that is no different than if the malfunction had not occurred. Typically, battery backed RAM devices can be used to preserve this critical data although other types of non-volatile memory devices may be employed.

As described in the preceding paragraph, when a malfunction occurs during a game of chance and/or a game of skill, the gaming machine 2 may be restored to a state in the game of chance just prior to when the malfunction occurred. The restored state may include metering information and graphical information that was displayed on the gaming machine 2 in the state prior to the malfunction. When a malfunction has occurred after the player has made one or more selections, the gaming machine 2 may be restored to a state that shows the graphical presentation at just prior to the malfunction, including an indication of selections that have already been made by the player. In general, the gaming machine 2 may be restored to any state in a plurality of states that occur in the game of chance and/or game of skill that occurs while the game of chance and/or game of skill is played or to states that occur between the play of a game of chance and/or game of skill.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine 2 (e.g., credits) at the time the game of chance and/or game of skill was played. The game history information may be utilized in the event of a dispute. For example, a player may decide that in a previous game of chance and/or game of skill that they did not receive credit for an award that they believed they won. The game history information may be used to reconstruct the state of the gaming machine prior, during and/or after the disputed game to demonstrate whether the player was correct or not in their assertion.

The gaming device 2 can further comprise one or more interfaces, including serial interfaces to connect to serial devices, to connect to specific subsystems internal and external to the gaming device 2. The serial devices may have electrical interface requirements that differ from the "standard" Electronic Industries Association (EIA) 232 serial interfaces. These interfaces may include EIA 485, EIA 422, Fiber Optic Serial, optically coupled serial interfaces, current loop style serial interfaces, etc. In addition, to conserve serial interfaces internally in the gaming device 2, serial devices may be connected in a shared, daisy-chain fashion where multiple peripheral devices are connected to a single serial channel.

The serial interfaces can be used to transmit information using communication protocols that are unique to the gaming industry. For example, the Netplex™ system of International Game Technology (IGT) is a proprietary communication protocol used for serial communication between gaming devices. As another example, Serial Attached Small Computer System Interface (SCSI) (SAS) is a communication protocol used to transmit information, such as metering information, from a gaming machine to a remote device. Often SAS is used in conjunction with a player tracking system.

The gaming device 2 can alternatively be treated as a peripheral device to a casino communication controller and connected in a shared daisy chain fashion to a single serial interface. In both cases, the peripheral devices can be assigned device addresses. If so, the serial controller circuitry can implement a method to generate or detect unique device addresses.

The gaming device 2 can comprise security monitoring circuits to detect intrusion into the gaming machine 2 by monitoring security switches attached to access doors in the cabinet 4. Access violations can result in suspension of game play and can trigger additional security operations to preserve the current state of game play. These circuits also function when power is off by use of a battery backup. In power-off operation, these circuits continue to monitor the access doors of the gaming machine 2. When power is restored, the gaming machine 2 can determine whether any security violations occurred while power was off, e.g., via software for reading status registers. This can trigger event log entries and further data authentication operations by software.

The gaming device 2 can comprise trusted memory devices to ensure the authenticity of the software that may be stored on less secure memory subsystems, such as mass storage devices. Trusted memory devices and controlling circuitry are typically designed to not allow modification of the code and data stored in the memory device while the memory device is installed in the gaming device 2. The code and data stored in these devices may include authentication algorithms, random number generators, authentication keys, operating system kernels, etc. The purpose of these trusted memory devices is to provide gaming regulatory authorities a root trusted authority within the computing environment of the gaming device 2 that can be tracked and verified as original. This may be accomplished via removal of the trusted memory device from the gaming device 2 and verification of the secure memory device contents is a separate third party verification device. Once the trusted memory device is verified as authentic, and based on the approval of the verification algorithms contained in the trusted device, the gaming machine 2 is allowed to verify the authenticity of additional code and data that may be located in the gaming device 2, such as code and data stored on hard disk drives.

Returning to the example of FIG. 1A, when a user wishes to play the gaming machine 2, he or she can insert cash through the coin acceptor 28 or bill validator 30. Additionally, the bill validator 30 can accept a printed ticket voucher which can be accepted by the bill validator 30 as indicia of credit when a cashless ticketing system is used. At the start of the game, the player can enter playing tracking information using the card reader 24, the keypad 22, and/or the florescent display 16. Further, other game preferences of the player playing the game can be read from a card inserted into the card reader 24. During the game, the player can view game information using the video display 34. Other game and prize information can also be displayed in the video display screen 42 located in the top box 6.

During the course of a game, a player can be required to make a number of decisions, which affect the outcome of the game. For example, a player can vary his or her wager on a particular game, select a prize for a particular game selected from a prize server, or make game decisions which affect the outcome of a particular game, including the selection of one or more entities from a listing of entities. The player can make these choices using the player-input switches 32, the video display screen 34 and/or using some other device which enables a player to input information into the gaming machine. For example, the player can use the play-input switches 32 or the video display screen 34 to select entities during a round of the game using the user interfaces shown in FIGS. 2A and 2B. In some embodiments, the player can be able to access various game services, such as concierge services and entertainment content services, using the video display screen 34 and one or more input devices.

During certain game events, the gaming machine 2 can display visual and auditory effects that can be perceived by the player. These effects can add to the excitement of a game, which can make a player more likely to continue playing. Auditory effects can comprise various sounds that are projected by the speakers 10, 12, 14. Visual effects can comprise flashing lights, strobing lights, and/or other patterns displayed from lights on the gaming machine 2 and/or from lights within the separate mechanical (or electronic) gaming system 40. After the player has completed a game, the player can receive game tokens from the coin tray 38 or the ticket 20 from the printer 18, which can be used to engage games or to redeem a prize. For example, the player can receive the prize from the coin tray 38 or the ticket 20 from the printer 18 after completing the game using the user interfaces shown in FIGS. 2A and 2B. Further, the player can receive a ticket 20 for food, merchandise, or games from the printer 18.

Figure 1B:
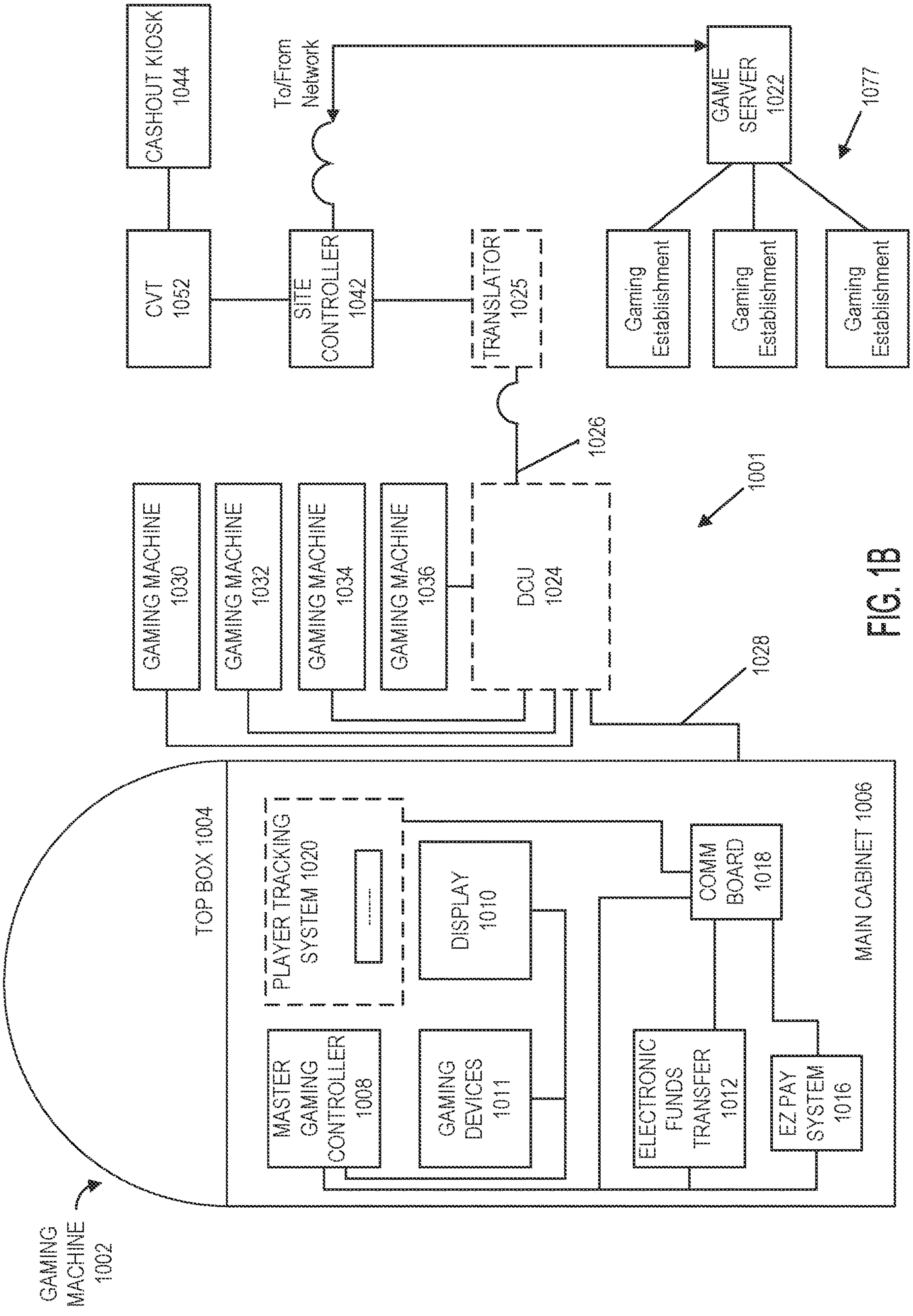
FIG. 1B shows an exemplary schematic for an electronic system for enabling play of the gaming methods described herein.

A gaming network that can be used to implement some aspects of the systems and methods described herein is depicted in FIG. 1B. Gaming establishment 1001 can be any sort of gaming establishment, such as a casino, a card room, an airport, a store, etc. Gaming network 1077 can comprise more than one gaming establishment, all of which are networked to game server 1022. Gaming machine 1002, and the other gaming machines 1030, 1032, 1034, and 1036, can comprise a main cabinet 1006 and a top box 1004. The main cabinet 1006 can house the main gaming elements and can also house peripheral systems, such as those that utilize dedicated gaming networks. The top box 1004 can also be used to house these peripheral systems.

The master gaming controller 1008 can control the game play on the gaming machine 1002 according to instructions and/or game data from game server 1022 and/or stored within gaming machine 1002 and/or can receive or send data to various input/output devices 1011 on the gaming machine 1002. For example, the master gaming controller 1008 can be used to control the game play for the game using the user interface shown in FIG. 1D. In one embodiment, master gaming controller 1008 can comprise processor(s) and other apparatuses of the gaming machines described above. The master gaming controller 1008 can also communicate with a display 1010. The display 1010 can be used to display the user interfaces shown in FIGS. 2A and 2B.

A particular gaming entity can provide network gaming services. Thus, dedicated networks can connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1008 can also communicate with EFT system 1012, EZPay™ system, and player tracking system 1020. The systems of the gaming machine 1002 can communicate the data onto the network 1022 via a communication board 1018.

It will be appreciated by those of skill in the art that embodiments of the systems and methods described herein could be implemented on a network with more or fewer elements than are depicted in FIG. 1B. For example, player tracking system 1020 is not a necessary feature of some implementations of the systems and methods described herein. However, player tracking programs can help to sustain a game player's interest in additional game play during a visit to a gaming establishment and can entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by a server-based gaming (SBG) system.

Moreover, data collection unit (DCU) 1024 and translator 1025 are not required for all gaming establishments 1001. However, due to the sensitive nature of much of the information on a gaming network (e.g., electronic fund transfers and player tracking data), the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine can be hard-wired into the gaming machine and each gaming machine manufacturer can utilize a different proprietary communication protocol. A gaming machine manufacturer can also produce host systems, in which case their gaming machines are compatible with their own host systems. However, in a heterogeneous gaming environment, gaming machines from different manufacturers, each with its own communication protocol, can be connected to host systems from other manufacturers, each with another communication protocol.

A network device that links a gaming establishment with another gaming establishment and/or a central system will sometimes be referred to herein as a "site controller." Here, site controller 1042 can provide this function for gaming establishment 1001. The site controller 1042 can be connected to a central system and/or other gaming establishments via one or more networks, which can be public or private networks. Among other things, the site controller 1042 can communicate with game server 1022 to obtain game data, such as ball drop data, bingo card data, etc. For example, the site controller 1042 can communicate with the game server 1022 to obtain the game using the user interface shown in FIG. 1D.

Gaming machines 1002, 1030, 1032, 1034 and 1036 can be connected to a dedicated gaming network 1022. In general, the DCU 1024 can function as an intermediary between the different gaming machines on the network 1022 and the site controller 1042. In general, the DCU 1024 can receive data transmitted from the gaming machines and send the data to the site controller 1042 over a transmission path 1026. In some instances, when the hardware interface used by the gaming machine is not compatible with site controller 1042, a translator 1025 can be used to convert serial data from the DCU 1024 to a format accepted by site controller 1042. The translator 1025 can provide this conversion service to a plurality of DCUs.

Further, in some dedicated gaming networks, the DCU 1024 can receive data transmitted from site controller 1042 for communication to the gaming machines on the gaming network. The received data can be, for example, communicated synchronously to the gaming machines on the gaming network.

Here, clerk validation terminal (CVT) 1052 can provide cashless and cashout gaming services to the gaming machines in gaming establishment 1001. For example, CVT 1052 can provide cashless and cashout gaming services to gaming machines executing the game using the user interface shown in FIG. 1D. Broadly speaking, CVT 1052 can authorize and validate cashless gaming machine instruments (also referred to herein as "tickets" or "vouchers"), including but not limited to tickets for causing a gaming machine to display a game result and cash-out tickets. Moreover, CVT 1052 can authorize the exchange of a cashout ticket for cash. These processes will be described in detail below. In one example, when a player attempts to redeem a cash-out ticket for cash at cash-out kiosk 1044, cash-out kiosk 1044 can read validation data from the cash-out ticket and transmit the validation data to CVT 1052 for validation. The tickets can be printed by gaming machines, by the cash-out kiosk 1044, by a stand-alone printer, by the CVT 1052, etc. Some gaming establishments may not have a cash-out kiosk 1044. Instead, a cash-out ticket can be redeemed for cash by a cashier (e.g. of a convenience store), by a gaming machine and/or by a specially configured CVT.

Figure 1C:
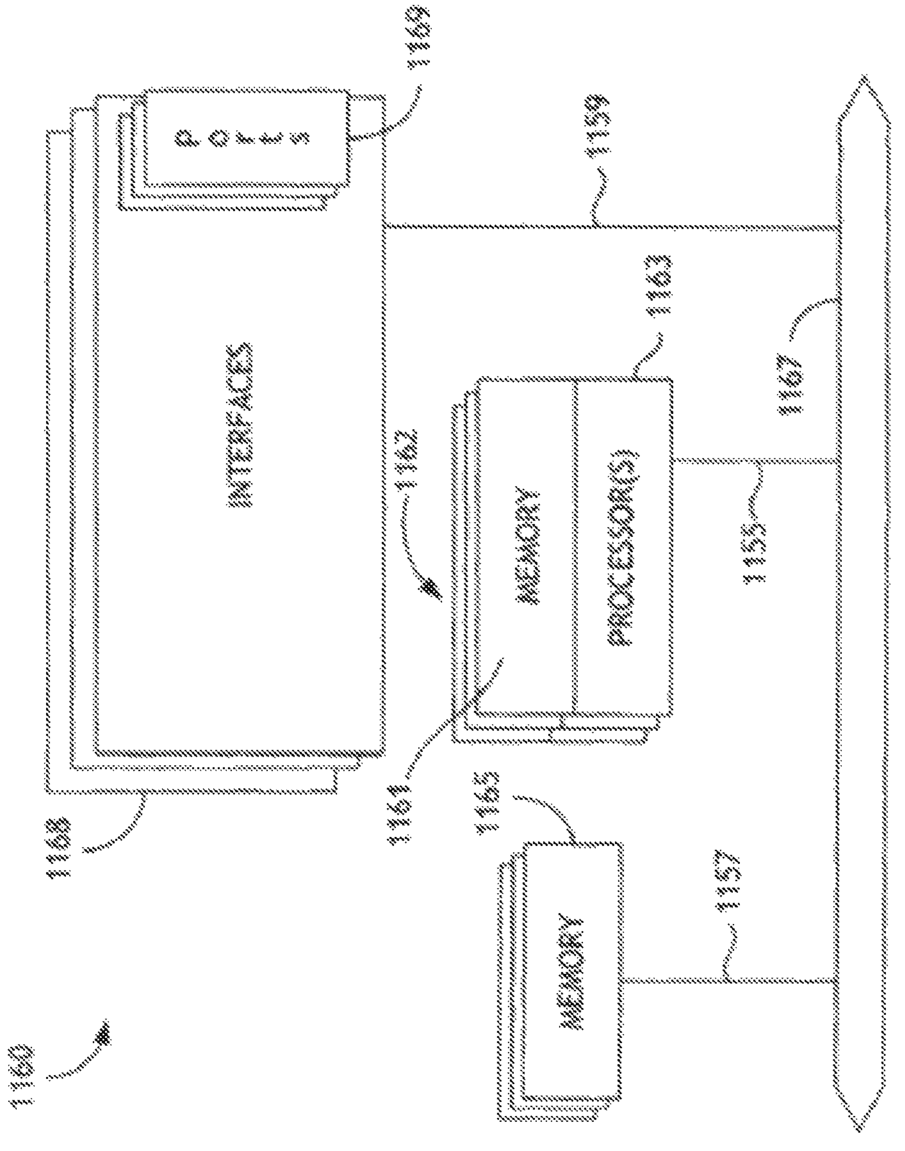
FIG. 1C shows another exemplary schematic for an electronic system for enabling play of the gaming methods described herein.

FIG. 1C illustrates an example of a network device that can be configured for implementing the systems and methods described herein. Network device 1160 can comprise a master central processing unit (CPU) 1162, interfaces 1168, and a bus 1167 (e.g., a PCI bus). Interfaces 1168 can comprise ports 1169 appropriate for communication with the appropriate media. In some embodiments, one or more of interfaces 1168 can comprise at least one independent processor and, in some instances, volatile RAM. The independent processors can be, for example, application specific integrated circuits (ASICs) or any other appropriate processors. According to some such embodiments, these independent processors can perform at least some of the functions of the logic described herein. In some embodiments, one or more of interfaces 1168 can control such communications-intensive tasks as encryption, decryption, compression, decompression, packetization, media control, and management. By providing separate processors for the communications-intensive tasks, interfaces 1168 can allow the master microprocessor 1162 efficiently to perform other functions such as routing computations, network diagnostics, security functions, etc.

The interfaces 1168 can be provided as interface cards (sometimes referred to as "linecards"). The interfaces 1168 can control the sending and receiving of data packets over the network and can support other peripherals used with the network device 1160. Among the interfaces 1168 that can be provided are Fibre Channel (FC) interfaces, Ethernet interfaces, frame relay interfaces, cable interfaces, digital subscriber line (DSL) interfaces, token ring interfaces, and the like. In addition, various very high-speed interfaces can be provided, such as fast Ethernet interfaces, Gigabit Ethernet interfaces, Asynchronous Transfer Mode (ATM) interfaces, High-Speed Serial Interface (HSSI) interfaces, Packet-over-Synchronous Optical Networking (SONET) (POS) interfaces, Fiber Distributed Data Interface (FDDI) interfaces, Actuator Sensor Interface (ASI) interfaces, DigiCable Headend Expansion Interface (DHEI) interfaces and the like.

The CPU 1162 can be responsible for implementing specific functions associated with the functions of a desired network device. According to some embodiments, the CPU 1162 can accomplish the systems and methods described herein under the control of instructions, including an operating system and any appropriate applications. The CPU 1162 can be used to execute the game using the user interface shown in FIG. 1D.

The CPU 1162 can comprise one or more processors 1163 such as a processor from the Motorola family of microprocessors or the MIPS family of microprocessors. In an alternative embodiment, the processor 1163 can be specially designed hardware for controlling the operations of network device 1160. In a specific embodiment, a memory 1161 (such as non-volatile RAM and/or ROM) also can form part of the CPU 1162. However, there are many different ways in which memory could be coupled to the system. The memory 1161 can be used for a variety of purposes such as, for example, caching and/or storing data, programming instructions, etc. The memory 1161 can be used to store instructions for performing the game using the user interface shown in FIG. 1D.

Regardless of network device's 1160 configuration, it can employ one or more memories or memory modules (such as, for example, memory block 1165) configured to store data, program instructions for the general-purpose network operations and/or other information relating to the functionality of the techniques described herein. The program instructions can control the operation of an operating system and/or one or more applications, for example.

A device enabling practice of the systems and methods described herein can comprise: a display device; a player position input device; a memory for storing a plurality of instructions; and a processor for accessing and executing the plurality of instructions. These instructions, when executed by the processor, can cause the processor to operate in cooperation with the display device and the input device to perform activities that are physically and visually determinable, for a performance of a wagering event and/or game of skill.

Figure 2A:
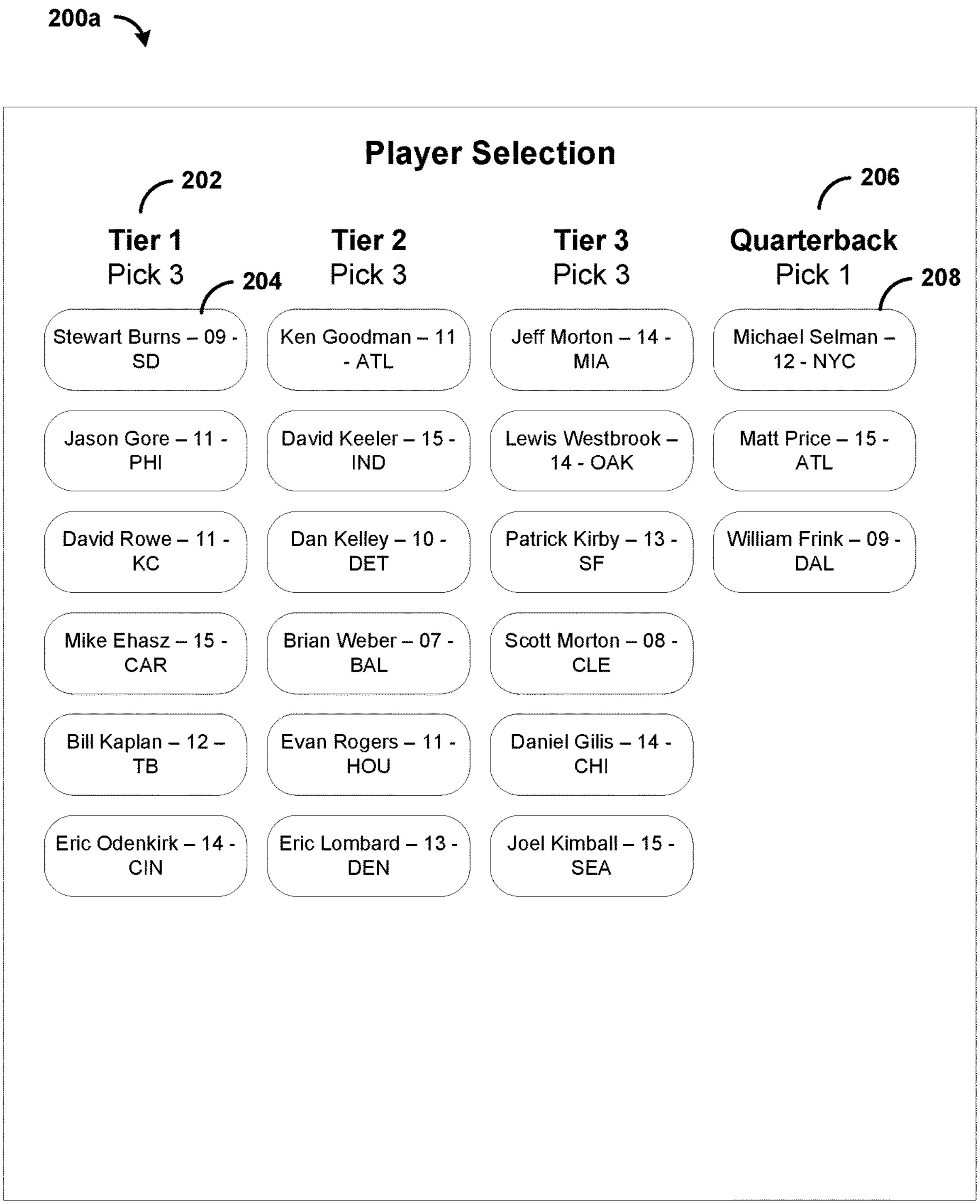
FIGS. 2A and 2B show example user interfaces for the gaming methods described herein.

Turning now to FIG. 2A, shown is an example user interface 200*a* for a round of gaming using historical performance data. The user interface 200*a* presents a listing of entities. In this example, the listing of entities is a listing of football players. As was described above, the listing of players can be selected randomly from a larger pool of players. Each of the players is grouped into one of three performance tiers 202*a*, 202*b*, and 202*c*, or a separate group 204 for quarterbacks. The user interface 200*a* solicits a selection of three players from each of the performance tiers 202*a*, 202*b*, and 202*c*, and a selection of one player from the quarterback group 204. Each of the selectable players is denoted by a user interface element 206. The user interface element 206 can correspond to a selectable button, a selectable touch-screen input, or other user interface element 206 facilitating the selection of a corresponding entity. In this example, each user interface element 206 lists a player name, a two-digit representation of a year, and a two- or three-letter abbreviation of a team of which the player was a member. Other information can also be presented to inform a user of the entities available for selection.

Figure 2B:
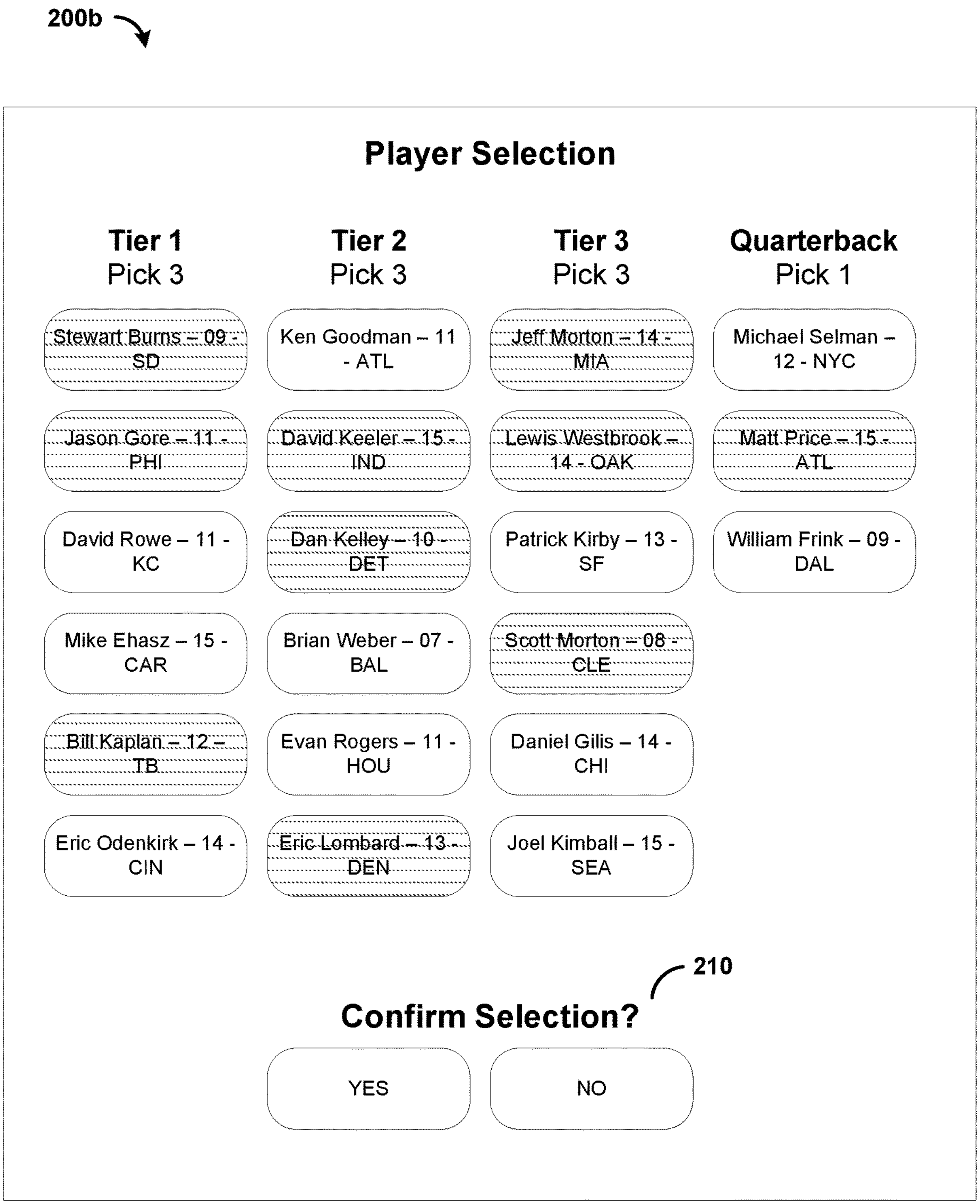

Moving on to FIG. 2B, shown is an example user interface 200*b*. Here, highlighted user interface elements 208 indicate which players have been selected by a user for inclusion in the given round of the game. Also shown is an input 210 for confirming the selection of players. On a "yes" selection from the input 210, the gaming machine presenting the user interface accesses the historical performance data for each of the selected players for a given performance period. In an aspect, performance period can be selected from multiple performance periods available for a selected player. In an aspect, the performance period can be selected according to a temporal constraint corresponding to the selected player. In this example, each player is listed with a corresponding two-digit year abbreviation. The performance period can comprise a game selected from a year or season denoted by the two-digit year abbreviation.

Using the historical performance data for each of the selected players, a payout is determined based on how many of the players meet or exceed a performance benchmark. In an aspect, the performance benchmark may be indicated to a user through a user interface 200*a* or 200*b*. The performance benchmark may also be hidden or otherwise unknown to a user. An example table of payouts is set forth in FIG. 3. Column 302 includes entries for a number of players who meet their respective performance benchmarks, with corresponding payouts in column 304. In this example, a user selecting five or fewer players whose performance benchmarks were met would receive no payout, and would receive increasingly greater payouts for each player above five who met their benchmark. In an aspect, the payout can also be based on a bet or number of credits used to initiate a round of a game.

In an aspect, the historical performance data for each of the selected players may be updated prior to determining how many of the players met or exceeded the performance benchmark. For example, the historical performance data for a group of quarterbacks may have changed in the intervening time period between the start of the game and the selection of the one or more of the entities. Updating the historical performance data would allow the game to be more accurate when determining whether the performance benchmark was met.

Figure 4:
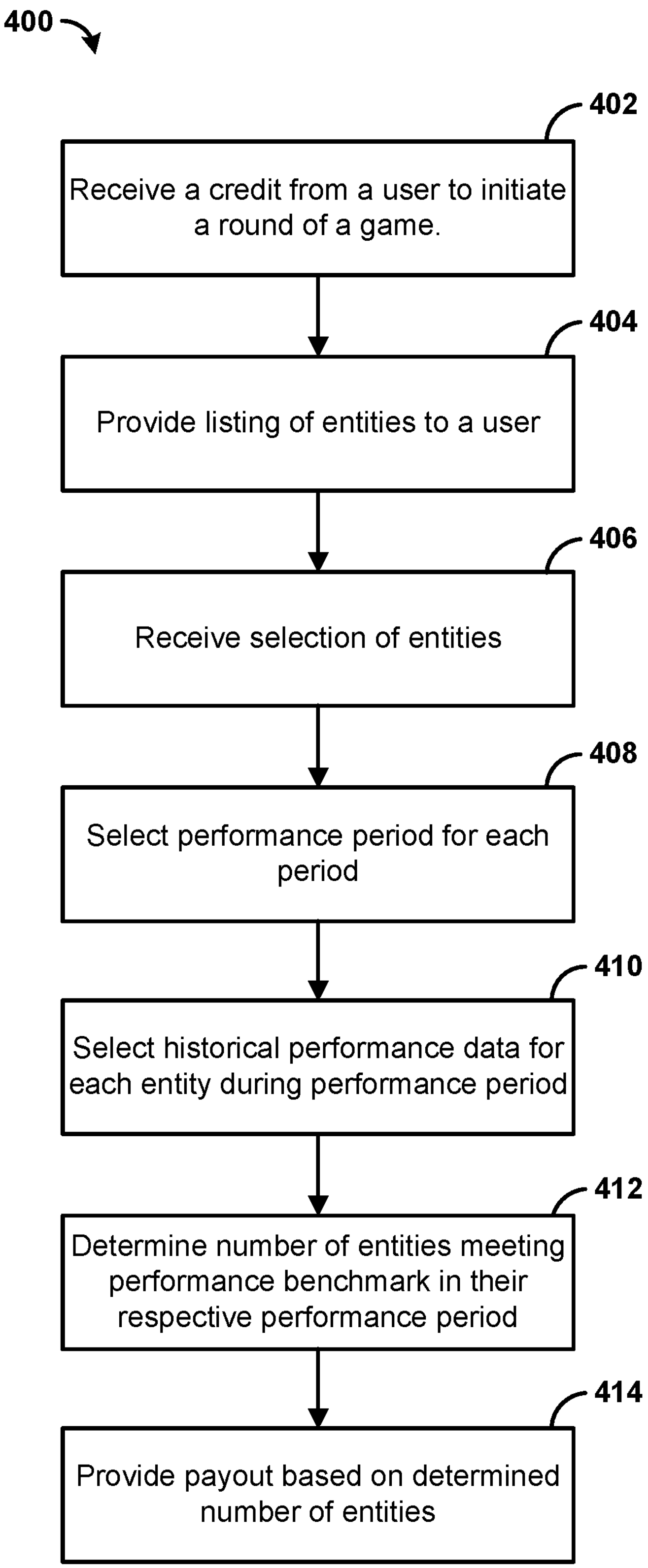
FIG. 4 shows an exemplary flow diagram.

FIG. 4 is a flow chart 400 of an exemplary method. At step 402, a credit can be received from a user to initiate a round of a game. A credit can be a coin, a ticket, money, a token, credit card information, debit card information, and/or the like. At step 404, a listing of entities is provided to a user. In an aspect, this can include selecting the listing of entities from a larger pool of entities. In an aspect, this selection can be performed randomly. In an aspect, the entities may be organized into one or more groups, including performance tiers, player positions, or other groups. In such an aspect, providing the listing of entities can include selecting a number of entities from each of the groups for presentation to the user. In an aspect, each of the entities may be associated with a temporal constraint, such as a year, season, or other period. For example, an entity listing can include a player and a corresponding year from which a performance period will be selected, as will be described below. In such an embodiment, an entity can appear more than once in the listing of entities provided that it is associated with a different temporal constraint. For example, a given player can appear multiple times in the listing of entities provided that each entry in the listing corresponds to a different season or year.

Next, at step 406, a selection of entities is received from the user. The entities are selected by the user from the listing of entities provided in step 404. In an aspect, the entities can be selected according to the groups into which the entities are classified. For example, a predefined number of entities can be selected from each of the groups. At step 408, a performance period is selected for each of the selected entities. The performance period can include, for example, an individual game, a series of games, a season, or a time period. In aspects in which the entities are associated with a temporal constraint, the performance period can be selected from within a time defined by the temporal constraint. For example, if a player is associated with a year in the listing of entities, the performance period can be selected as a game or series from within the associated year. As another example, if a stock is associated with a year, the performance period can be selected as a day, week, month, quarter, or other period within the year. The performance period can be selected randomly, or according to one or more rules. For example, the performance period can be selected as a predefined game number in the respective temporal constraint of a given entity. As an example, the performance period can be selected as the first game in the respective season corresponding to each selected entity.

At step 410, historical performance data is selected for each of the selected entities reflecting their performance during their corresponding selected performance period. In an aspect, the historical performance data for each of the selected entities may be updated prior to proceeding to the next step, which would improve the accuracy of the method. For example, for a given player having a given game as its selected performance period, the historical performance data would indicate that player's performance during that game. Next, at step 412, a number of entities meeting a performance benchmark in their respective performance period is determined using the historical performance data. This can include, for each entity, determining if a particular benchmark is met according to their selected historical performance data. The performance benchmark can include, for example, points scored, distance covered, percentage of attempts that were successful, money earned, growth percentage, or other benchmark as can be appreciated. In an aspect, the performance benchmark can be the same across all entities, or differ between entities.

At step 414, a payout is provided based on the number of selected entities that met their corresponding performance benchmark. For example, in an aspect, no payout can be provided if the number of entities meeting their performance benchmark falls below a threshold. In an aspect, the payout can increase as the number of entities meeting their performance benchmark increases above the threshold. In an aspect the payout can be based on a bet, number of credits, or previous payout used to initiate the round of the game.

Figure 5:
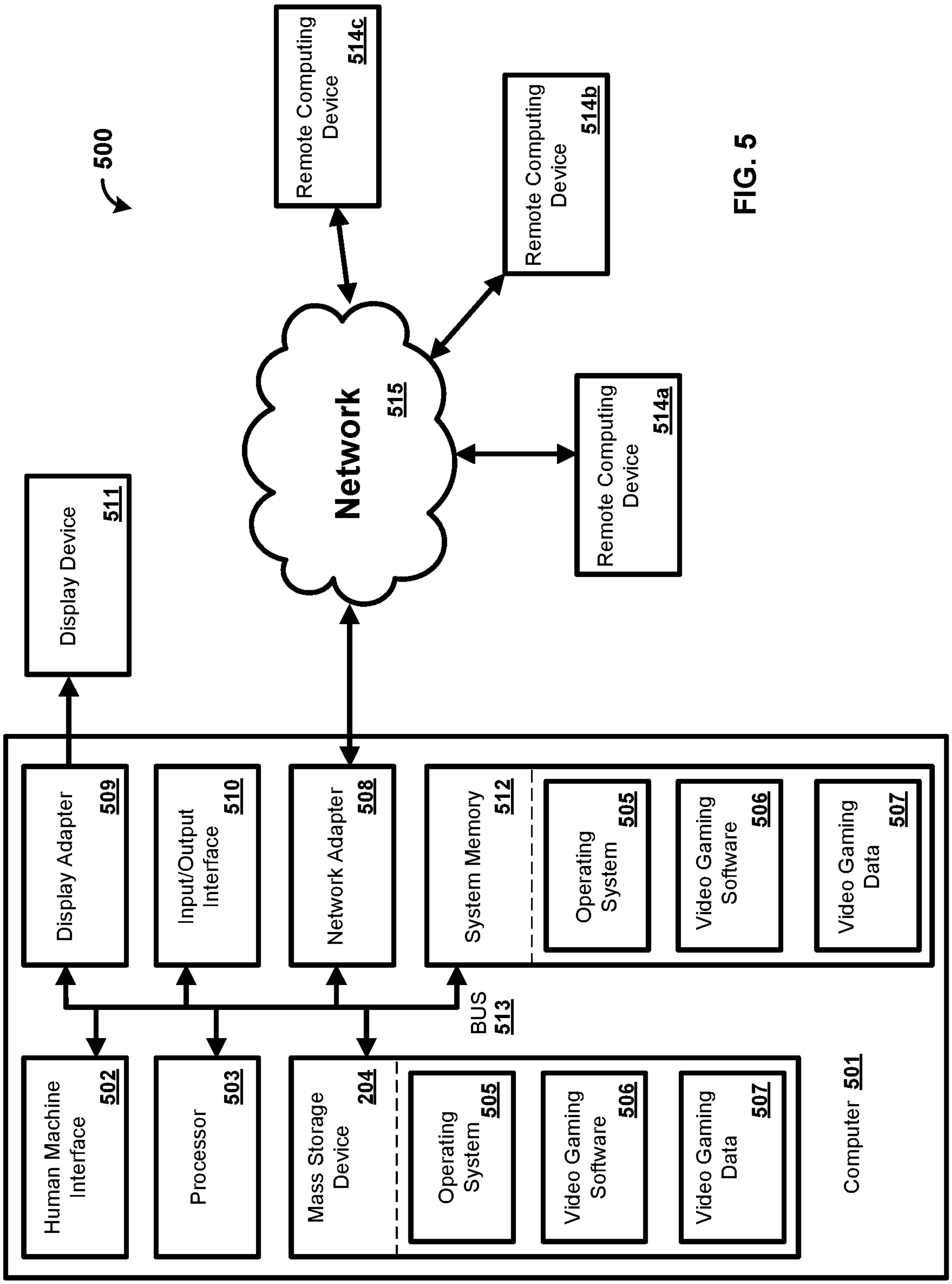
FIG. 5 shows an exemplary computing device.

In an exemplary aspect, the methods and systems can be implemented on a computer 501 as illustrated in FIG. 5 and described below. By way of example, video gaming machine 2 of FIG. 1A can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the one or more processors 503, a mass storage device 504, an operating system 505, video gaming software 506, video gaming data 507, a network adapter 508, the system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the video gaming data 507 and/or program modules such as the operating system 505 and the video gaming software 506 that are immediately accessible to and/or are presently operated on by the one or more processors 503.

In another aspect, the computer 501 can also comprise other removable/non-removable, volatile/non-volatile computer storage media. By way of example, FIG. 5 illustrates the mass storage device 504 which can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the video gaming software 506. Each of the operating system 505 and the video gaming software 506 (or some combination thereof) can comprise elements of the programming and the video gaming software 506. The video gaming data 507 can also be stored on the mass storage device 504. The video gaming data 207 can be stored in any of one or more databases known in the art. Examples of such databases comprise, DB2@, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, the display device 511 can also be connected to the system bus 513 via an interface, such as the display adapter 509. It is contemplated that the computer 501 can have more than one display adapter 509 and the computer 501 can have more than one display device 511. For example, the display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514*a,b,c*. By way of example, a remote computing device can be a personal computer, portable computer, smartphone, a server, a router, a network computer, a peer device or other common network node, and so on. Logical connections between the computer 501 and a remote computing device 514*a,b,c* can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the video gaming software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

determining, by a computing device, for a round of a game associated with a mobile gaming device, a listing of entities randomly from a pool of entities, wherein the round of the game is associated with an amount of available credits indicated by the mobile gaming device;

determining, by the computing device, based on a performance period associated with the listing of entities, an update to historical performance data associated with a plurality of entities, wherein the plurality of entities are selected at the mobile gaming device from the listing of entities;

determining, by the computing device, based on the update to the historical performance data, a quantity of the plurality of entities that met a performance benchmark during the performance period;

determining, by the computing device, based on the quantity of the plurality of entities that met the performance benchmark, and based on the amount of available credits, a payout; and providing, by the computing device, to the mobile gaming device, an indication of the payout.

2. The method of claim 1, wherein the pool of entities comprises a plurality of sports players, and wherein the performance period comprises one or more of a game/match, a season, a year, or a portion thereof.

3. The method of claim 1, further comprising:

receiving, by the computing device, via a user interface of the mobile gaming device, a selection of the amount of available credits for the round of the game.

4. The method of claim 1, further comprising:

providing, by the computing device, for presentation via a user interface of the mobile gaming device, the listing of entities and the performance period; and receiving, by the computing device, via the user interface of the mobile gaming device, a selection of the plurality of entities from the listing of entities.

5. The method of claim 1, further comprising:

sending, by the mobile gaming device to the computing device, an indication of the plurality of entities selected from the listing of entities.

6. The method of claim 1, wherein the performance benchmark comprises one or more of a number of runs, a number of points scored, a number of yards gained, a number of successful shots, or a number of attempted shots.

7. The method of claim 1, wherein the performance benchmark for at least one entity of the plurality of entities differs from the performance benchmark for at least one other entity of the plurality of entities.

8. A method comprising:

receiving, via a user interface of a mobile gaming device, a selection of an amount of available credits for a round of a game;

sending, to a computing device associated with the game, an indication of:

the amount of available credits, and a plurality of entities selected at the mobile gaming device from a listing of entities associated with a performance period, wherein the listing of entities is determined by the computing device randomly from a pool of entities; and outputting, via the user interface of the mobile gaming device, an indication of a payout for the round of the game, wherein the computing device determines the payout based on:

updated historical performance data associated with the plurality of entities, a quantity of the plurality of entities that met a performance benchmark during the performance period, and the amount of available credits.

9. The method of claim 8, wherein the pool of entities comprises a plurality of sports players, and wherein the performance period comprises one or more of a game/match, a season, a year, or a portion thereof.

10. The method of claim 8, further comprising:

causing, by the computing device, the listing of entities and the performance period to be output at the user interface of the mobile gaming device.

11. The method of claim 8, further comprising:

determining, by the computing device based on the performance period, the updated historical performance data;

determining, by the computing device based on the updated historical performance data, the quantity of the plurality of entities that met the performance benchmark; and determining, by the computing device, the payout.

12. The method of claim 8, wherein the performance benchmark comprises one or more of a number of runs, a number of points scored, a number of yards gained, a number of successful shots, or a number of attempted shots.

13. The method of claim 8, wherein the performance benchmark for at least one entity of the plurality of entities differs from the performance benchmark for at least one other entity of the plurality of entities.

14. The method of claim 8, wherein the mobile gaming device comprises a mobile phone.

15. A non-transitory computer readable medium storing processor executable instructions that, when executed by a computing device, cause the computing device to:

determine, for a round of a game associated with a mobile gaming device, a listing of entities randomly from a pool of entities, wherein the round of the game is associated with an amount of available credits indicated by the mobile gaming device;

determine, based on a performance period associated with the listing of entities, an update to historical performance data associated with a plurality of entities, wherein the plurality of entities are selected at the mobile gaming device from the listing of entities;

determine, based on the update to the historical performance data, a quantity of the plurality of entities that met a performance benchmark during the performance period;

determine, based on the quantity of the plurality of entities that met the performance benchmark, and based on the amount of available credits, a payout; and provide, to the mobile gaming device, an indication of the payout.

16. The non-transitory computer readable medium of claim 15, wherein the pool of entities comprises a plurality of sports players.

17. The non-transitory computer readable medium of claim 15, wherein the performance period comprises one or more of a game/match, a season, a year, or a portion thereof.

18. The non-transitory computer readable medium of claim 15, wherein the performance benchmark comprises one or more of a number of runs, a number of points scored, a number of yards gained, a number of successful shots, or a number of attempted shots.

19. The non-transitory computer readable medium of claim 15, wherein the performance benchmark for at least one entity of the plurality of entities differs from the performance benchmark for at least one other entity of the plurality of entities.

20. The non-transitory computer readable medium of claim 15, wherein the processor executable instructions further cause the computing device to receive, from the mobile gaming device, an indication of the amount of available credits.

* * * * *